US006268592B1

(12) United States Patent
Hu et al.

(10) Patent No.: US 6,268,592 B1
(45) Date of Patent: Jul. 31, 2001

(54) ELECTRIC GRILL PLATE APPLIANCE FOR TORTILLA CUISINE

(75) Inventors: Michael G. Hu, Lockport, IL (US); Ming-Jen Huang, San Gabriel, CA (US)

(73) Assignee: Tsann Kuen USA, Inc., Pasadena, CA (US)

( * ) Notice: Subject to any disclaimer, the term of this patent is extended or adjusted under 35 U.S.C. 154(b) by 0 days.

(21) Appl. No.: 09/484,477

(22) Filed: Jan. 18, 2000

(51) Int. Cl.[7] .............................. H05B 3/68; H05B 3/00
(52) U.S. Cl. ........................................ 219/450.1; 99/378
(58) Field of Search ...................... 219/450.1, 454.12, 219/455.11, 465.1, 468.1, 524, 525; 99/378, 400, 422, 425, 444, 445

(56) References Cited

U.S. PATENT DOCUMENTS

| | | | |
|---|---|---|---|
| 1,871,705 | * 8/1932 | Keul | 219/452.11 |
| 2,362,757 | * 11/1944 | Lang | 99/425 |
| 3,098,924 | * 7/1963 | Salton et al. | 219/449.1 |
| 6,016,741 | * 1/2000 | Tsai et al. | 99/341 |
| 6,097,004 | * 8/2000 | Seul | 219/438 |

* cited by examiner

*Primary Examiner*—Sang Paik
(74) *Attorney, Agent, or Firm*—Loyal McKinley Hanson

(57) ABSTRACT

An appliance for cooking fajitas and other tortilla cuisine includes an electric grill plate having a plate component with a cooking surface, an electrical heating element component adapted to heat the plate component for purposes of cooking foodstuffs placed on the cooking surface, a portion of the plate component that defines a compartment adapted to hold a stack of tortillas for purposes of warming the tortillas with heat derived from the electric grill plate, and a cover for the compartment. One embodiment includes a removable tortilla tray within the tortilla warming compartment for holding the tortillas while they warm so that the cook can lift the tortilla tray from the tortilla warming compartment for purposes of transporting the tortillas to the table. Ribs on the plate component facilitate drainage of grease, oil, and other runoff liquids from the fajitas and other foodstuffs through a hole in the plate component to a removable collection drawer. A separate tortilla rack holds a tortilla in a semi-folded configuration that facilitates addition of the cooked foodstuffs to it. A removable plastic base holds the plate component during usage while disassembling from the plate component for cleaning.

9 Claims, 3 Drawing Sheets

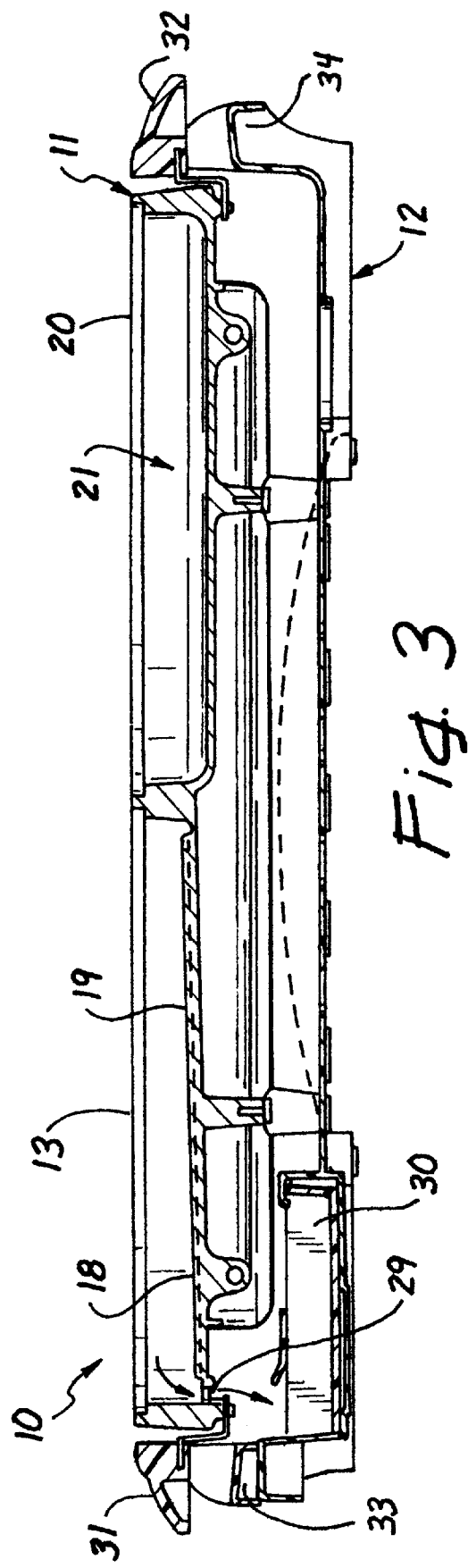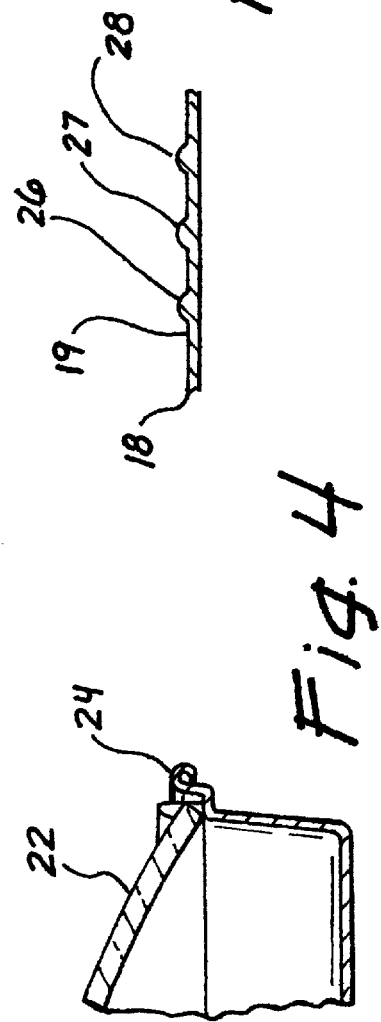
Fig. 3
Fig. 4
Fig. 5

ELECTRIC GRILL PLATE APPLIANCE FOR TORTILLA CUISINE

BACKGROUND OF THE INVENTION

1. Technical Field

This invention relates generally to appliances for preparing foodstuffs, and more particularly to an electric tabletop grill plate appliance especially suited for tortilla cuisine.

2. Description of Related Art

An electric grill plate appliance provides a lightweight, portable cooking appliance that a user can conveniently transport manually for table top or counter top use. It includes an electric cooking plate that is sometimes called an electric grill plate. The electric grill plate itself includes two basic components: (i) a plate component with a cooking surface (usually non-stick), and (ii) an electric heating element component in heat conducting relation to the plate component. The user simply plugs the heating element component into an electric outlet, adjusts the heating element temperature control knob to a selected range, arranges foodstuffs on the non-stick cooking surface of the plate component, and then tends the foodstuffs as needed until all is cooked as desired.

Such cooking appliances enjoy popular approval. But consumers continue to look for new healthy culinary adventures that challenge existing electric tabletop grill plate designs. Users want simpler, lighter, home-style cooking, ethnic breads/dishes, regional cooking, and fresh quality produce. They want the electric tabletop grill plate they use to help them create the new, interesting, and fun meals they envision . . . tortilla cuisine included.

Tortilla cuisine refers to edibles that include or are served with tortillas. Fajitas provide a good example. Fajitas are marinated strips (usual beef or chicken) that are usually grilled or broiled and served with flour tortillas and various savory fillings. To prepare fajitas with existing electric grill plates, the cook arranges the meat or chicken strips on the cooking surface of the grill, along with red, green, and yellow peppers, onions, tomatoes, seasonings, and so forth, while at the same time warming some tortillas on the stove top, in the oven, or in the microwave. When the foodstuffs are cooked, he adds some to a tortilla for consumption, or simply leaves the cook foodstuffs and warmed tortillas at the table for his guests to combine.

The problem is that the cook must resort to the stove top, oven, microwave, or other appliance to warm the tortilla. That means another appliance and the restrictions thereby imposed (e.g., the cost, the space, the electricity, an additional electrical outlet, and so forth). Thus, manufacturers and users need some way to alleviate that concern.

SUMMARY OF THE INVENTION

This invention addresses the concerns outlined above by providing an electric grill plate appliance with a built-in tortilla warming compartment. Only one appliance is needed. Everything the cook needs is conveniently group together, avoiding the additional cost, space, electricity, electrical outlet, and so forth otherwise involved.

To paraphrase some of the more precise language appearing in the claims, an electric grill plate appliance constructed according to the invention for tortilla cuisine includes (i) an electric grill plate having a plate component and a heating element component in heat conducting relation to the plate component, (ii) a first portion of the plate component that defines a cooking surface on which to cook foodstuffs, the heating element being adapted to heat the plate component for purposes of cooking foodstuffs placed on the cooking surface, (iii) a second portion of the plate component that defines a compartment adapted to hold a stack of tortillas for purposes of warming the tortillas, and (iv) a cover (preferably see-through and vented) that is adapted to rest removably on the electric grill plate in a position over the compartment.

One embodiment includes those elements and more. A removable tortilla tray within the tortilla warming compartment holds the tortillas while they warm. The cook can lift the tortilla tray from the tortilla warming compartment for purposes of transporting the tortillas elsewhere, away from the compartment. Ribs on the plate component protruded upwardly from the cooking surface in order to facilitate grease and oil drainage from the fajitas and other foodstuffs through a drainage hole in the plate component to a removable collection drawer. A separate tortilla rack holds a tortilla in a semi-folded configuration that facilitates addition of the cooked foodstuffs to it. A removable plastic base holds the electric grill plate spaced apart from the table or other support surface while readily disassembling from the electric grill plate for cleaning purposes.

Thus, the electric grill plate appliance of this invention is especially suited for preparing fajitas and other tortilla cuisine. The following illustrative drawings and detailed description make the foregoing and other objects, features, and advantages of the invention more apparent.

BRIEF DESCRIPTION OF THE DRAWINGS

FIG. 3 is an enlarged cross sectional view of the electric grill plate appliance taken on line 3—3 of FIG. 1;

FIG. 4 is a further enlarged cross sectional view of a portion of the the tortilla tray and the cover;

FIG. 5 is a cross sectional view of a portion of the plate component taken on line 5—5 of FIG. 1;

DESCRIPTION OF THE PREFERRED EMBODIMENTS

Figures 1, 2:
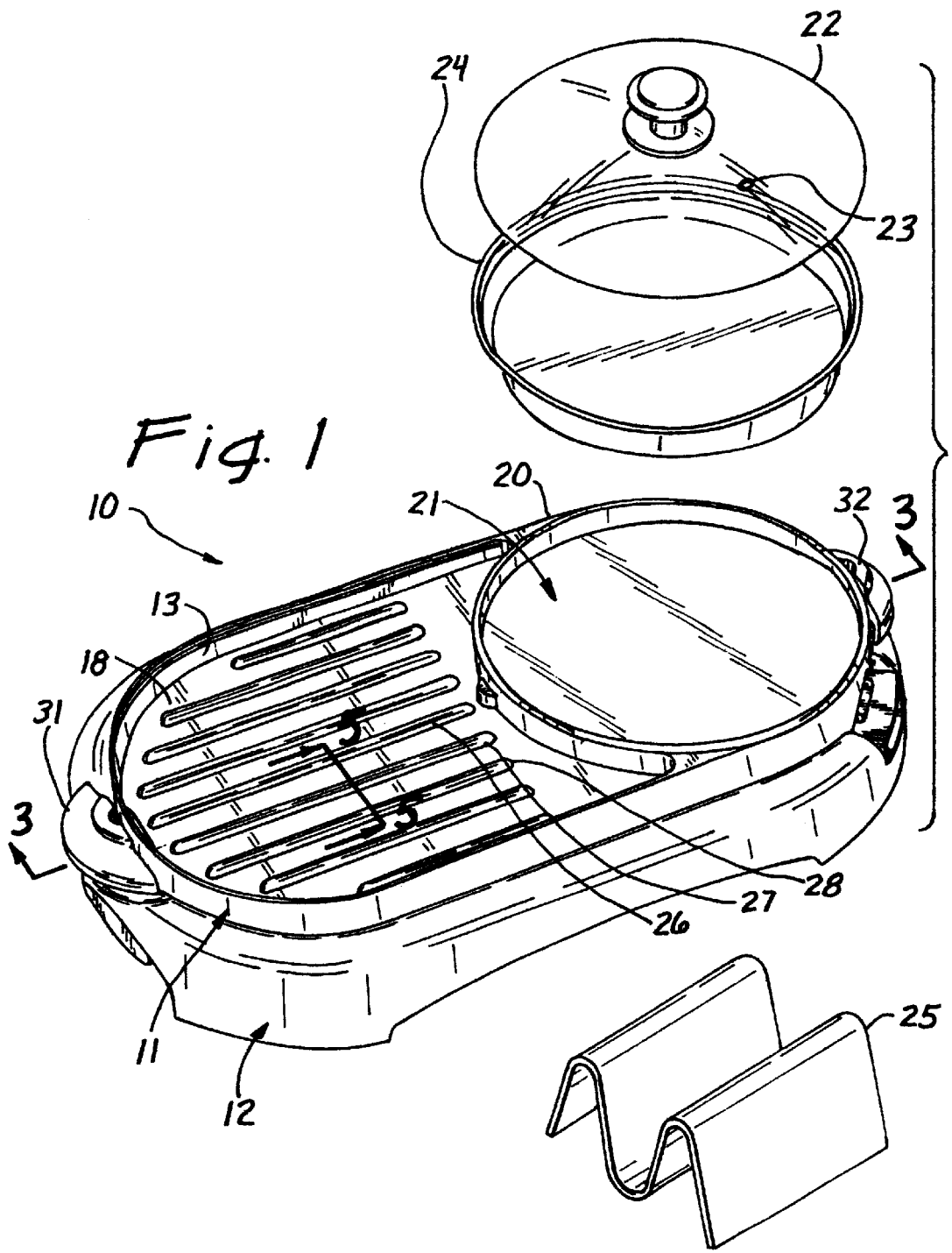
FIG. 1 of the drawings is an isometric view of an electric grill plate appliance constructed according to the invention, showing the tortilla tray and the cover removed from the tortilla warming compartment.
FIG.2 is an isometric view of the tortilla rack component.
Figure 6:
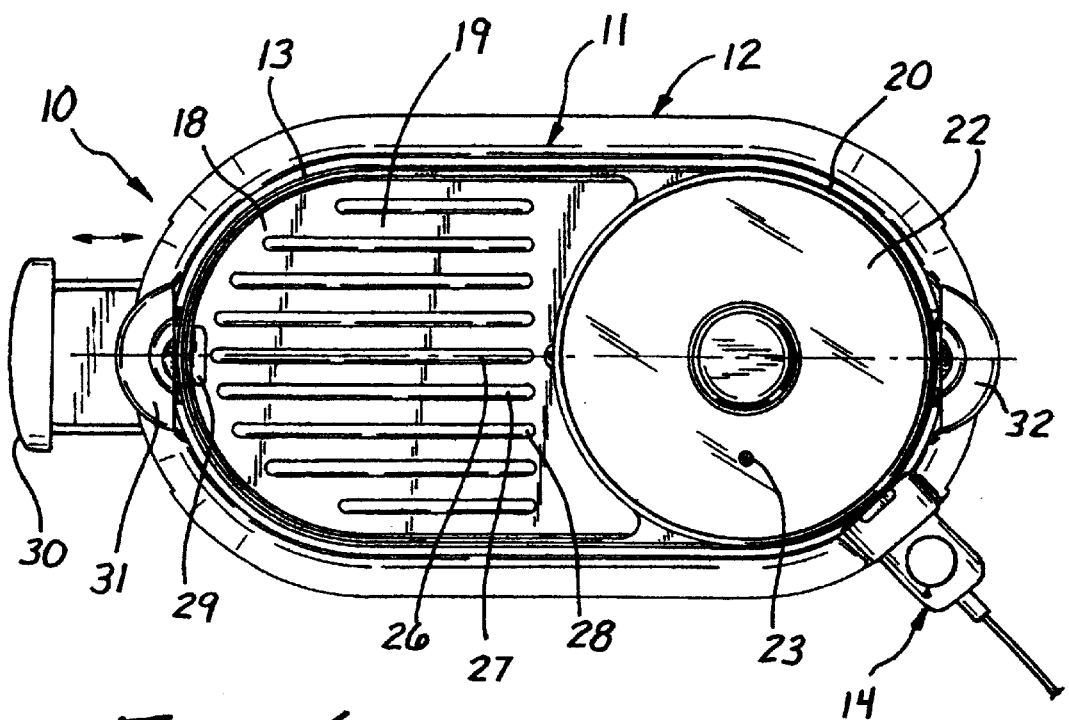
FIG. 6 is a top view of the electric grill plate appliance, with the grease drawer in an open position.
Figure 7:
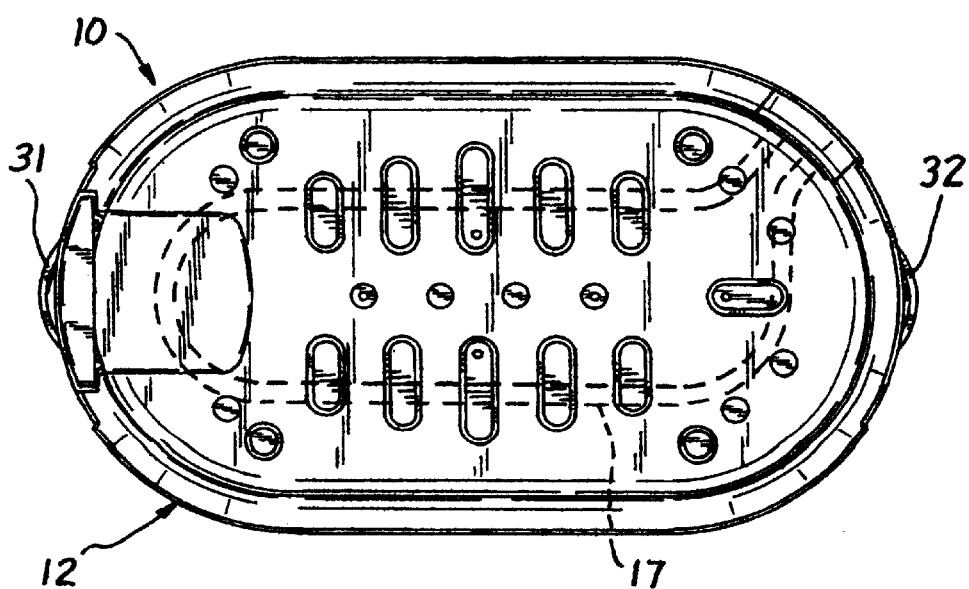
FIG. 7 is a bottom view of the electric grill plate appliance, showing further details of the removable base.

FIGS. 1–7 of the drawings show various aspects of an electric grill plate appliance 10 constructed according to the invention. Generally, the appliance 10 includes an electric grill plate 11 on a base 12. Those two components are adapted to be conveniently disassembled for cleaning purposes and reassembled for use. The base 12 is composed of a suitably rigid material (e.g., plastic or metallic), and it is adapted to removably receive and hold the electric grill plate 11 spaced apart from a table top or other horizontal support surface upon which the base 12 is placed.

The electric grill plate 11 utilizes known technology in some respects in that it includes a non-stick coated, heavy gauge aluminum plate component 13 (FIGS. 1, 3, and 6) and a heating element component 14 (FIG. 6) in heat conducting relation to the plate component 13. The heating element component 14 is not illustrated in detail because it is a known type of electric component. It is designated only generally in FIG. 6 for purposes of this description by a leadline to a temperature controller 15 which is part of the heating element component 14. The heating element component 14 may include, for example, an imbedded 1200 watt round coiled heating element 17 within the plate component 13 (as depicted by dashed lines in FIG. 7) and a temperature probe outfitted temperature controller (i.e., the temperature controller 15 in FIG. 6). These components are arranged so that the electric grill plate 11 is adapted to fit removably in the base 12. Based upon the foregoing and subsequent descriptions, one of ordinary skill can readily fabricated these components to function as described.

According to a major aspect of the invention, the plate component 13 includes a first portion 18 (FIGS. 1, 3, 5, and 6) that includes an upwardly facing cooking surface 19 on which to cook foodstuffs, and a second portion 20 (FIGS. 1, 3, and 6) that defines an upwardly opening compartment 21 adapted to hold a stack of tortillas for purposes of warming the tortillas. A tortilla is not shown for illustrated convenience. It is a well known food item in the form of a round thin cake of unleavened cornmeal or wheat flour bread that is usually eaten warm with a topping or filling. A typical tortilla may measure about eight inches in diameter, although some are larger and some are smaller. The compartment 21 is sized accordingly. It is circularly shaped with a diameter measuring about 9.5 inches and a depth measuring about one inch. As a further idea of size, the overall height of the combination of the electric grill plate 11 and the base 12 as illustrated in FIG. 3 is about 3.5 inches. The overall length of the plate component 13 is about nineteen to twenty inches, with the first portion 18 extending a total of about 9.5 inches up to the second portion 20. Of course, the dimensions of an electric grill plate appliance constructed according to the invention may vary a greatly without departing from the broader inventive concepts disclosed, and the compartment 21 can be shaped and dimension to accommodate larger or smaller tortillas.

Heat from the electric grill plate 11 warms the compartment 21 and the tortillas within the compartment 21. A cover 22 (FIGS. 1, 4, and 6) helps hold the heat in. Preferably a see-through tempered glass component with a vent 23 (FIGS. 1 and 6), the cover 22 is adapted to rest removably on the electric grill plate 11 in a position over the compartment. It can rest directly upon the electric grill plate 11 by resting directly upon it or atop a tortilla tray 24 (FIGS. 1 and 4) placed in the compartment 21. The phrase "adapted to rest removably on the electric grill plate" is intended to cover either or both configurations.

With the tortilla tray 24 placed in the compartment 21, the cover 22 covers the tray 24 and the compartment 21. The tray 24 is adapted to fit in the compartment 21 removably and to function as means for holding the tortillas in the compartment 21 during warming while enabling usage of the tray 24 as a portable tray with which to transport the tortillas elsewhere after warming. The illustrated tray 24 is about ¾ inch deep. A separate tortilla rack 25 (FIG. 2) is also provided for the cook to use in holding a tortilla in a semi-folded position while he adds fillings to it.

The first portion 18 of the plate component 13 includes upwardly protruding ribs. The illustrated embodiment includes nine ribs, but only three ribs 26, 27, and 28 are designated in FIGS. 1, 5, and 6 for illustrative convenience. The ribs facilitate drainage of grease, oil, and other runoff liquids from foodstuffs being cooked on the first portion 18. The ribs tend to hold the foodstuffs slightly spaced apart from the cooking surface 19.

The runoff liquids drain through a drainage hole 29 in the first portion 18 of the plate component 13 (FIGS. 3 and 6) into a collection drawer 30 that is part of the base 12. The drawer 30 is removable from the base 12. It is adapted to be moved from the closed position shown in FIG. 3, as depicted by the double headed arrow in FIG. 6, in order to remove and drawer 30 from the base 12 for cleaning purposes.

Plastic handles 31 and 32 (FIGS. 1, 3, 6, and 7) are attached to opposite ends of the plate component 13 by suitable means. The user can carry the appliance 10 by places his thumbs on the handles 31 and 32 while curling his fingers under finger depressions 33 and 34 in the base 12 that are designated in FIG. 3. In other words, the base 12 is configured so that the electric grill plate 11 can be lifted directly out of it for disassembly and cleaning purposes. Holes in the base 12 facilitate air movement in order to prevent too much heat from reaching the table top. Only one such hole 35 is designated in FIG. 7 for illustrative convenience.

Thus, the invention provides an electric grill plate appliance with a built-in tortilla warming compartment. Only one appliance is needed. Everything the cook needs is conveniently group together, avoiding the additional cost, space, electricity, electrical outlet, and so forth otherwise involved.

The illustrated embodiment includes a removable tortilla tray within the tortilla warming compartment holds the tortillas while they warm. The cook can lift the tortilla tray from the tortilla warming compartment for purposes of transporting the tortillas elsewhere, away from the compartment. Ribs on the plate component protruded upwardly from the cooking surface in order to facilitate drainage from the fajitas and other foodstuffs through a drainage hole in the plate component to a removable collection drawer. A separate tortilla rack holds a tortilla in a semi-folded configuration that facilitates addition of the cooked foodstuffs to it. A removable plastic base holds the electric grill plate spaced apart from the table or other support surface while readily disassembling from the electric grill plate for cleaning purposes. Although an exemplary embodiment has been shown and described, one of ordinary skill in the art may make many changes, modifications, and substitutions without necessarily departing from the spirit and scope of the invention.

What is claimed is:

1. An electric grill plate appliance, comprising:
   an electric grill plate having a plate component and a heating element component in heat conducting relation to the plate component;
   a first portion of the plate component that includes an upwardly facing cooking surface on which to cook foodstuffs, the heating element being adapted to heat the plate component for purposes of cooking foodstuffs placed on the cooking surface;
   a second portion of the plate component that defines an upwardly opening compartment adapted to hold a stack of tortillas for purposes of warming the tortillas; and
   a cover adapted to rest removably on the electric grill plate in a position over the compartment.

2. An appliance as recited in claim 1, further comprising a base component adapted to rest atop a horizontal support surface and to hold the electric grill plate spaced apart from the support surface.

3. An appliance as recited in claim 2, wherein the plate component defines a drainage hole that enables liquid to drain from the cooking surface, and the base component includes a removable drawer disposed beneath the drainage hole to function as means for collecting the liquid.

4. An appliance as recited in claim 1, wherein the cover is at least partially composed of an at least partially transparent material.

5. An appliance as recited in claim 1, wherein the cover includes a vent.

6. An appliance as recited in claim 1, further comprising a tray component adapted to fit in the compartment removably and to function as means for holding the tortillas during warming while enabling usage of the tray component as a portable tray with which to transport the tortillas away from the compartment after warming.

7. An appliance as recited in claim 1, wherein the compartment is circularly shaped.

8. An electric grill plate appliance, comprising:

an electric grill plate having a plate component and a heating element component in heat conducting relation to the plate component;

a base component adapted to rest atop a horizontal support surface and to hold the electric grill plate spaced apart from the support surface;

a first portion of the plate component that includes an upwardly facing cooking surface on which to cook foodstuffs, the heating element being adapted to heat the plate component for purposes of cooking foodstuffs placed on the cooking surface;

a second portion of the plate component that defines an upwardly opening compartment adapted to hold a stack of tortillas for purposes of warming the tortillas;

a tray component adapted to fit in the compartment removably and to function as means for holding the tortillas during warming while enabling usage of the tray component as a portable tray with which to transport the tortillas away from the compartment after warming; and a vented cover adapted to rest removably on the electric grill plate in a position over the compartment.

9. An appliance as recited in claim 8, wherein the plate component defines a drainage hole that enables liquid to drain from the cooking surface, and the base component includes a removable drawer disposed beneath the drainage hole to function as means for collecting the liquid.

\* \* \* \* \*